(12) United States Patent
Ishii

(10) Patent No.: US 11,014,166 B2
(45) Date of Patent: May 25, 2021

(54) COATED CUTTING TOOL

(71) Applicant: TUNGALOY CORPORATION, Fukushima (JP)

(72) Inventor: Katsuya Ishii, Iwaki (JP)

(73) Assignee: TUNGALOY CORPORATION, Iwaki (JP)

(*) Notice: Subject to any disclaimer, the term of this patent is extended or adjusted under 35 U.S.C. 154(b) by 420 days.

(21) Appl. No.: 16/227,011

(22) Filed: Dec. 20, 2018

(65) Prior Publication Data
US 2019/0232384 A1    Aug. 1, 2019

(30) Foreign Application Priority Data
Jan. 26, 2018   (JP) .............................. JP2018-011266

(51) Int. Cl.
*B23B 27/14* (2006.01)
*C23C 28/04* (2006.01)
*C23C 30/00* (2006.01)

(52) U.S. Cl.
CPC .......... *B23B 27/148* (2013.01); *C23C 28/042* (2013.01); *C23C 28/044* (2013.01); *C23C 30/005* (2013.01); *B23B 2224/04* (2013.01); *B23B 2224/28* (2013.01); *B23B 2224/32* (2013.01); *B23B 2224/36* (2013.01); *B23B 2226/125* (2013.01); *B23B 2226/18* (2013.01); *B23B 2228/04* (2013.01); *B23B 2228/105* (2013.01); *B23B 2228/36* (2013.01)

(58) Field of Classification Search
CPC ... B23B 27/14; B23B 27/148; B23B 2224/04; B23B 2224/32; C23C 16/36; C23C 16/403

USPC .......... 51/307, 309; 428/336, 698, 701, 702
See application file for complete search history.

(56) References Cited

U.S. PATENT DOCUMENTS

| | | | | |
|---|---|---|---|---|
| 5,851,687 A * | 12/1998 | Ljungberg | ............ | C23C 16/403 428/689 |
| 2006/0115662 A1* | 6/2006 | Ruppi | ................... | C23C 28/048 428/701 |
| 2014/0308083 A1* | 10/2014 | Bjormander | .............. | B23C 5/16 407/119 |
| 2016/0136786 A1* | 5/2016 | Bjormander | .......... | C23C 30/005 51/309 |

FOREIGN PATENT DOCUMENTS

JP    H10-156606 A    6/1998

\* cited by examiner

*Primary Examiner* — Archene A Turner
(74) *Attorney, Agent, or Firm* — Studebaker & Brackett PC

(57) ABSTRACT

A coated cutting tool according to the present invention is a coated cutting tool comprising a substrate and a coating layer formed on a surface of the substrate, wherein: the coating layer comprises a lower layer, an intermediate layer formed on a surface of the lower layer, and an upper layer formed on a surface of the intermediate layer; the lower layer is a predetermined Ti compound layer with a predetermined average thickness; the intermediate layer is an α-type aluminum oxide layer with a predetermined average thickness; the upper layer is a Ti carbonitride layer with a predetermined average thickness; and a texture coefficient of a predetermined plane of each of the α-type aluminum oxide layer and the Ti carbonitride layer falls within a predetermined range.

16 Claims, 1 Drawing Sheet

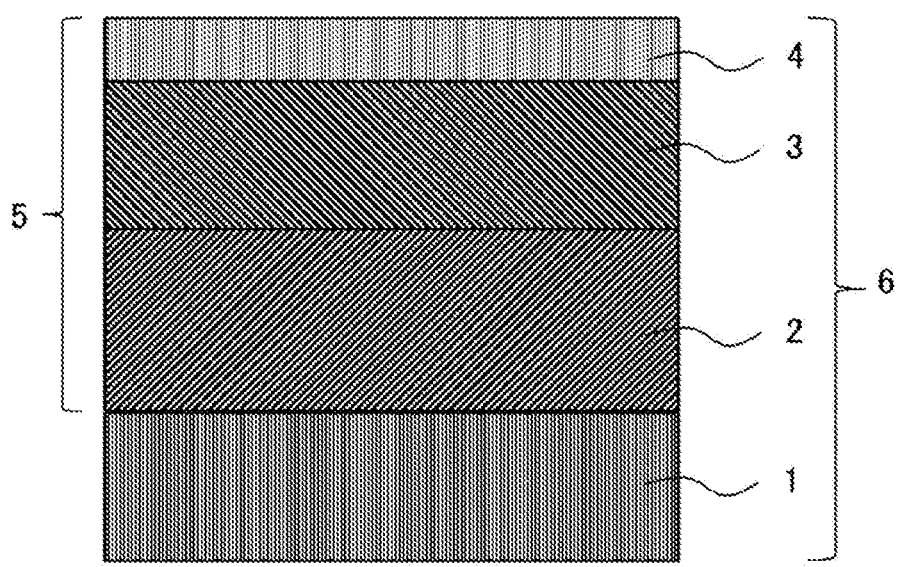

COATED CUTTING TOOL

TECHNICAL FIELD

The present invention relates to a coated cutting tool.

BACKGROUND ART

It is well known that a conventional coated cutting tool used for the cutting of steel, cast iron, etc., is a coated cutting tool which is obtained by depositing, via chemical vapor deposition, a coating layer with a total thickness of from 3 μm or more to 20 μm or less on a surface of a substrate consisting of a cemented carbide. A known example of the above coating layer is a coating layer consisting of a single layer of one kind selected from the group consisting of a Ti carbide, a Ti nitride, a Ti carbonitride, a Ti carboxide, a Ti oxycarbonitride, and aluminum oxide, or consisting of multiple layers of two or more kinds selected therefrom.

JPH10-156606 A discloses an aluminum oxide coated tool comprising, on a surface of a substrate: an inner layer film consisting of a single layer coating of one kind selected from among carbides, nitrides, carbonitrides, oxides, carboxides, oxynitrides and oxycarbonitrides of group IVa, Va and VIa metals of the periodic table or a multilayer coating of two or more kinds selected therefrom; and an oxide film mainly comprising at least one α-type aluminum oxide layer. This aluminum oxide coated tool is characterized in that: a binding layer containing oxygen is provided between the inner layer film and the oxide film; the lattice fringes of the inner layer film and the lattice fringes of the binding layer are continuous with each other at the interface between the inner layer film and the binding layer; the lattice fringes of the oxide film and the lattice fringes of the binding layer are continuous with each other at the interface between the oxide film and the binding layer; and the X-ray diffraction highest peak plane of the oxide film is a (110) plane.

SUMMARY OF THE INVENTION

Technical Problem

An increase in speed, feed and depth of cut has become more conspicuous in cutting in recent times, and the wear resistance of a tool and the fracture resistance thereof are required to be further improved compared to those involved in the prior art. In particular, in recent times, there has been a growth in cutting which places a load on a coated cutting tool, such as high-speed cutting of steel, and under such severe cutting conditions, a coated tool comprising an aluminum oxide layer having preferential orientation of a (110) plane, like the above aluminum oxide coated tool, has a problem in that the falling of particles from the coating layer leads to a rapid progress of wear so that the tool life cannot be extended and also has a problem in that the falling of particles from the coating layer leads to fracturing.

The present invention has been made in order to solve these problems, and an object of the present invention is to provide a coated cutting tool which has excellent wear resistance and fracture resistance and which accordingly allows for an extended tool life.

Solution to Problem

The present inventor has conducted studies regarding extending the tool life of a coated cutting tool from the above-described perspective and has then found that the following configurations, including optimizing the crystal orientation in a predetermined plane of each of an α-type aluminum oxide layer and a Ti carbonitride layer, allow the wear resistance and the fracture resistance to be improved as the falling of particles is suppressed, and found that, as a result, the tool life of the coated cutting tool can be extended, and this has led to the completion of the present invention.

Namely, the present invention is as set forth below:

[1] A coated cutting tool comprising a substrate and a coating layer formed on a surface of the substrate, wherein:
the coating layer comprises a lower layer, an intermediate layer formed on a surface of the lower layer, and an upper layer formed on a surface of the intermediate layer;
the lower layer is a Ti compound layer of one or more layers selected from the group consisting of a Ti carbide layer, a Ti nitride layer, a Ti carbonitride layer, a Ti carboxide layer and a Ti oxycarbonitride layer;
an average thickness of the lower layer is from 3.0 μm or more to 15.0 μm or less;
the intermediate layer is comprised of an α-type aluminum oxide layer;
an average thickness of the intermediate layer is from 3.0 μm or more to 15.0 μm or less;
in the α-type aluminum oxide layer, a texture coefficient TC (110) of a (110) plane represented by formula (1) below is from 1.5 or more to 6.5 or less;
the upper layer is comprised of a Ti carbonitride layer;
an average thickness of the upper layer is from 1.5 μm or more to 8.0 μm or less; and
in the Ti carbonitride layer in the upper layer, a texture coefficient TC (511) of a (511) plane represented by formula (2) below is from 1.5 or more to 5.0 or less.

$$TC(110) = \frac{I(110)}{I_0(110)} \left\{ \frac{1}{8} \Sigma \frac{I(hkl)}{I_0(hkl)} \right\}^{-1} \quad (1)$$

(In formula (1), I (hkl) denotes a peak intensity for an (hkl) plane in X-ray diffraction of the α-type aluminum oxide layer, $I_0$ (hkl) denotes a standard diffraction intensity for an (hkl) plane which is indicated on JCPDS Card No. 10-0173 for α-type aluminum oxide, and (hkl) refers to the eight crystal planes of (012), (104), (110), (113), (024), (116), (214) and (030).)

$$TC(511) = \frac{I(511)}{I_0(511)} \left\{ \frac{1}{6} \Sigma \frac{I(hkl)}{I_0(hkl)} \right\}^{-1} \quad (2)$$

(In formula (2), I (hkl) denotes a peak intensity for an (hkl) plane in X-ray diffraction of the Ti carbonitride layer, $I_0$ (hkl) denotes an average value of a standard diffraction intensity for an (hkl) plane which is indicated on JCPDS Card No. 32-1383 for Ti carbide and a standard diffraction intensity for an (hkl) plane which is indicated on JCPDS Card No. 32-1420 for Ti nitride, and (hkl) refers to the six crystal planes of (111), (200), (220), (311), (422) and (511).)

[2] The coated cutting tool according to [1], wherein, in the Ti carbonitride layer in the upper layer, the texture coefficient TC (511) is from 3.0 or more to 5.0 or less.

[3] The coated cutting tool according to [1] or [2], wherein, in the α-type aluminum oxide layer, the texture coefficient TC (110) is from 4.0 or more to 6.5 or less.

[4] The coated cutting tool according to any of [1] to [3], wherein an average thickness of the entire coating layer is from 7.5 μm or more to 25.0 μm or less.

[5] The coated cutting tool according to any of [1] to [4], wherein the substrate is a cemented carbide, cermet, ceramic or a cubic boron nitride sintered body.

Advantageous Effects of Invention

The present invention can provide a coated cutting tool which has excellent wear resistance and fracture resistance and which accordingly allows for an extended tool life.

BRIEF DESCRIPTION OF DRAWINGS

FIG. 1 is a schematic cross-sectional view showing an example of a coated cutting tool according to the present invention.

DESCRIPTION OF EMBODIMENTS

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention. In the drawings, unless otherwise specified, positional relationships, such as vertical and horizontal relationships, are based on the positional relationships shown in the drawings. Further, the dimensional ratios of the drawings are not limited to those shown therein.

The coated cutting tool according to the present embodiment is a coated cutting tool comprising a substrate and a coating layer formed on a surface of the substrate, wherein: the coating layer comprises a lower layer, an intermediate layer formed on a surface of the lower layer, and an upper layer formed on a surface of the intermediate layer; the lower layer is a Ti compound layer of one or more layers selected from the group consisting of a Ti carbide layer, a Ti nitride layer, a Ti carbonitride layer, a Ti carboxide layer and a Ti oxycarbonitride layer; an average thickness of the lower layer is from 3.0 μm or more to 15.0 μm or less; the intermediate layer is comprised of an α-type aluminum oxide layer; an average thickness of the intermediate layer is from 3.0 μm or more to 15.0 μm or less; in the α-type aluminum oxide layer, a texture coefficient TC (110) of a (110) plane represented by formula (1) below is from 1.5 or more to 6.5 or less; the upper layer is comprised of a Ti carbonitride layer; an average thickness of the upper layer is from 1.5 μm or more to 8.0 μm or less; and in the Ti carbonitride layer (hereinafter also referred to as a "TiCN layer") in the upper layer, a texture coefficient TC (511) of a (511) plane represented by formula (2) below is from 1.5 or more to 5.0 or less.

$$TC(110) = \frac{I(110)}{I_0(110)} \left\{ \frac{1}{8} \Sigma \frac{I(hkl)}{I_0(hkl)} \right\}^{-1} \quad (1)$$

(In formula (1), I (hkl) denotes a peak intensity for an (hkl) plane in X-ray diffraction of the α-type aluminum oxide layer, $I_0$ (hkl) denotes a standard diffraction intensity for an (hkl) plane which is indicated on JCPDS Card No. 10-0173 for α-type aluminum oxide, and (hkl) refers to the eight crystal planes of (012), (104), (110), (113), (024), (116), (214) and (030).)

$$TC(511) = \frac{I(511)}{I_0(511)} \left\{ \frac{1}{6} \Sigma \frac{I(hkl)}{I_0(hkl)} \right\}^{-1} \quad (2)$$

(In formula (2), I (hkl) denotes a peak intensity for an (hkl) plane in X-ray diffraction of the Ti carbonitride layer, $I_0$ (hkl) denotes an average value of a standard diffraction intensity for an (hkl) plane which is indicated on JCPDS Card No. 32-1383 for Ti carbide and a standard diffraction intensity for an (hkl) plane which is indicated on JCPDS Card No. 32-1420 for Ti nitride, and (hkl) refers to the six crystal planes of (111), (200), (220), (311), (422) and (511).) Herein, the average value of $I_0$ (111) is 76, the average value of $I_0$ (200) is 100, the average value of $I_0$ (220) is 52.5, the average value of $I_0$ (311) is 24.5, the average value of $I_0$ (422) is 18.5, and the average value of $I_0$ (511) is 11.5.

The coated cutting tool of the present embodiment comprises the above-described configurations, whereby the falling of particles is suppressed even under cutting conditions which place a load on the coated cutting tool. This allows the wear resistance of the coated cutting tool to be improved and also allows the fracture resistance thereof to be improved, and as a result, the tool life of the coated cutting tool can be extended. The factors for the improvements in wear resistance and fracture resistance of the coated cutting tool of the present embodiment can be considered to be set forth as follows. However, the factors are not limited to those set forth below. Firstly, the coated cutting tool of the present embodiment comprises an intermediate layer comprised of an α-type aluminum oxide layer having preferential orientation of a (110) plane (i.e., having a texture coefficient TC (110) of a specific value or more) and having a thickness falling within a predetermined rage, and this leads to excellent adhesion between the intermediate layer and a lower layer comprised of a Ti compound layer. It can be inferred that, when the α-type aluminum oxide layer has preferential orientation of a (110) plane, pores and large defects are less likely to appear in the interface between the intermediate layer and the lower layer, and that this serves as a factor for excellent adhesion between the intermediate layer and the lower layer; however, this inference does not limit the present invention in any way. As a result, the coated cutting tool has excellent chipping resistance and fracture resistance. On the other hand, in a conventional coated cutting tool, an α-type aluminum oxide layer having preferential orientation of a (110) plane invites the problem of inferior wear resistance. Meanwhile, in the coated cutting tool of the present embodiment, an upper layer, being comprised of a TiCN layer, having preferential orientation of a (511) plane (i.e., having a texture coefficient TC (511) of a specific value or more) and having a thickness falling within a predetermined range is further provided on a surface of the intermediate layer comprised of an α-type aluminum oxide layer, and such coated cutting tool further comprises an upper layer comprised of a TiCN layer having a thickness which falls within a predetermined range. This increases the area ratio of the smooth surface structure, thereby resulting in the suppression of a locally applied load, and this serves as a major factor for the suppression of the falling of particles from the α-type aluminum oxide layer. Further, the upper layer comprised of a TiCN layer having preferential orientation of a (511) plane has excellent adhesion with respect to the α-type aluminum oxide layer having preferential orientation of a (110) plane, and thus, even if the thickness of such upper layer is increased, the coated cutting tool still has excellent chipping resistance and fracture resistance.

FIG. 1 is a schematic cross-sectional view showing an example of a coated cutting tool according to the present embodiment. A coated cutting tool 6 is provided with a substrate 1 and a coating layer 5 formed on a surface of the substrate 1. In the coating layer 5, a lower layer 2, an intermediate layer 3 and an upper layer 4 are laminated in this order in an upward direction from the substrate 1 side.

A coated cutting tool according to the present embodiment comprises a substrate and a coating layer formed on a surface of the substrate. Specific examples of types of the coated cutting tool include an indexable cutting insert for milling or turning, a drill and an end mill.

The substrate in the present embodiment is not particularly limited, as long as it may be used as a substrate for a coated cutting tool. Examples of such substrate include a cemented carbide, cermet, ceramic, a cubic boron nitride sintered body, a diamond sintered body and high-speed steel. From among the above examples, the substrate is preferably comprised of a cemented carbide, cermet, ceramic or a cubic boron nitride sintered body as this provides further excellent wear resistance and fracture resistance, and, from the same perspective, the substrate is more preferably comprised of a cemented carbide.

It should be noted that the surface of the substrate may be modified. For instance, when the substrate is comprised of a cemented carbide, a β-free layer may be formed on the surface thereof, and when the substrate is comprised of cermet, a hardened layer may be formed on the surface thereof. The operation and effects of the present invention are still provided even if the substrate surface has been modified in this way.

The average thickness of the entire coating layer in the present embodiment is preferably from 7.5 μm or more to 25.0 μm or less. If the average thickness of the entire coating layer is 7.5 μm or more, this leads to improved wear resistance, and if such average thickness is 25.0 μm or less, this leads to improved adhesion of the coating layer with respect to the substrate and improved fracture resistance. From the same perspective, the average thickness of the entire coating layer is more preferably from 8.0 μm or more to 23.0 μm or less, and is further preferably from 10.0 μm or more to 20.0 μm or less. It should be noted that, as to the average thickness of each layer and the average thickness of the entire coating layer in the coated cutting tool of the present embodiment, each of such average thicknesses can be obtained by: measuring the thickness of each layer or the thickness of the entire coating layer from each of the cross-sectional surfaces at three or more locations in each layer or in the entire coating layer; and calculating the arithmetic mean of the resulting measurements.

[Lower Layer]

The lower layer of the present embodiment is a Ti compound layer of one or more layers selected from the group consisting of a Ti carbide layer (hereinafter also referred to as a "TiC layer," a Ti nitride layer (hereinafter also referred to as a "TiN layer"), a Ti carbonitride layer (hereinafter also referred to as a "TiCN layer"), a Ti carboxide layer (hereinafter also referred to as a "TiCO layer") and a Ti oxycarbonitride layer (hereinafter also referred to as a "TiCNO layer"). If a coated cutting tool comprises a lower layer between a substrate and an intermediate layer containing α-type aluminum oxide (hereinafter also referred to as "α-type $Al_2O_3$"), this leads to improved wear resistance and improved adhesion.

The lower layer may be constituted by a single layer or multiple layers (for example, two or three layers). However, the lower layer is preferably constituted by multiple layers, is more preferably constituted by two or three layers, and is further preferably constituted by three layers. When the lower layer is constituted by three layers: a TiC layer or a TiN layer, serving as a first layer, may be provided on a surface of a substrate; a TiCN layer, serving as a second layer, may be provided on a surface of the first layer; and a TiCNO layer or a TiCO layer, serving as a third layer, may be provided on a surface of the second layer. In particular, as to the lower layer: a TiN layer, serving as a first layer, may be provided on a surface of a substrate; a TiCN layer, serving as a second layer, may be provided on a surface of the first layer; and a TiCNO layer, serving as a third layer, may be provided on a surface of the second layer.

The average thickness of the lower layer in the present embodiment is from 3.0 μm or more to 15.0 μm or less. If the average thickness of the lower layer is 3.0 μm or more, this leads to improved wear resistance. Meanwhile, if the average thickness of the lower layer is 15.0 μm or less, the peeling of the coating layer is suppressed, and this serves as a major factor for improved fracture resistance. From the same perspective, the average thickness of the lower layer is more preferably from 3.5 μm or more to 12.0 μm or less, and is further preferably from 3.5 μm or more to 10.0 μm or less.

The average thickness of the first layer (the TiC layer or the TiN layer), from the perspective of further improving wear resistance and fracture resistance, is preferably from 0.05 μm or more to 1.0 μm or less. From the same perspective, the average thickness of the first layer is more preferably from 0.10 μm or more to 0.50 μm or less, and is further preferably from 0.15 μm or more to 0.30 μm or less.

The average thickness of the second layer (the TiCN layer), from the perspective of further improving wear resistance and fracture resistance, is preferably from 2.0 μm or more to 20.0 μm or less. From the same perspective, the average thickness of the second layer is more preferably from 2.5 μm or more to 15.0 μm or less, and is further preferably from 3.0 μm or more to 10.0 μm or less.

The average thickness of the third layer (the TiCNO layer or the TiCO layer), from the perspective of further improving wear resistance and fracture resistance, is preferably from 0.1 μm or more to 1.0 μm or less. From the same perspective, the average thickness is more preferably from 0.2 μm or more to 0.5 μm or less.

The Ti compound layer is a layer consisting of one or more layers from among the above-described layers. However, such Ti compound layer may contain a very small amount of components other than the above elements, as long as it provides the operation and effects of the present invention.

[Intermediate Layer]

The intermediate layer of the present embodiment is comprised of an α-type aluminum oxide layer. The α-type aluminum oxide layer consists of α-type aluminum oxide.

The average thickness of the α-type aluminum oxide layer in the present embodiment is from 3.0 μm or more to 15.0 μm or less. If the average thickness of the α-type aluminum oxide layer is 3.0 μm or more, this indicates the tendency of the crater wear resistance in the rake surface of the coated cutting tool to be further improved, and, if such average thickness is 15.0 μm or less, this indicates the tendency of the fracture resistance of the coated cutting tool to be further improved as the peeling of the coating layer is further suppressed. From the same perspective, the average thickness of the α-type aluminum oxide layer is preferably from 3.0 μm or more to 12.0 μm or less, is more preferably from 3.5 μm or more to 10.0 μm or less, and is further preferably from 4.0 μm or more to 10.0 μm or less.

In the α-type aluminum oxide layer, the texture coefficient TC (110) of a (110) plane, which is represented by formula (1), is from 1.5 or more to 6.5 or less. If the texture coefficient TC (110) is 1.5 or more, this leads to improved adhesion of the α-type aluminum oxide layer with respect to the lower layer (in particular, the Ti carbonitride layer), thereby resulting in excellent chipping resistance and fracture resistance. Meanwhile, it is difficult, in terms of manufacturing, to create a coated cutting tool which involves a texture coefficient TC (110) of over 6.5. From the same perspective, the texture coefficient TC (110) is preferably 1.8 or more, is more preferably 2.0 or more, is further preferably 3.0 or more, and is particularly preferably 4.0 or more.

The intermediate layer is a layer comprised of an α-type aluminum oxide layer. However, such intermediate layer may contain a very small amount of components other than α-type aluminum oxide (α-type $Al_2O_3$), as long as it provides the operation and effects of the present invention.

[Upper Layer]

The upper layer of the present embodiment is comprised of a Ti carbonitride layer (a TiCN layer).

The average thickness of the upper layer in the present embodiment is from 1.5 μm or more to 8.0 μm or less. The average thickness of 1.5 μm or more leads to an improvement in the effect of suppressing the falling of particles from the α-type aluminum oxide layer, and the average thickness of 8.0 μm or less leads to improved fracture resistance. From the same perspective, the average thickness of the upper layer is more preferably from 1.5 μm or more to 5.0 μm or less.

In the upper layer, the texture coefficient TC (511) of a (511) plane, which is represented by formula (2), is from 1.5 or more to 5.0 or less. If the texture coefficient TC (511) is 1.5 or more, this leads to an increased area ratio of the smooth surface structure, and this serves as a factor for reduced cutting resistance. This results in the suppression of the falling of particles, thereby leading to improved wear resistance of the coated cutting tool. Further, if the texture coefficient TC (511) is 1.5 or more, this leads to improved adhesion of the upper layer with respect to the α-type aluminum oxide layer having preferential orientation of a (110) plane, and this serves as a factor for excellent chipping resistance and fracture resistance even if the thickness of such upper layer is increased. Meanwhile, it is difficult, in terms of manufacturing, for the texture coefficient TC (511) to be over 5.0. From the same perspective, the texture coefficient TC (511) is preferably 1.6 or more, is more preferably 2.0 or more, is further preferably 2.5 or more, and is particularly preferably 3.0 or more.

The upper layer is a layer comprised of a TiCN layer. However, such upper layer may contain a very small amount of components other than TiCN, as long as it provides the operation and effects of the present invention.

Examples of a method of forming layers that constitute a coating layer in a coated cutting tool according to the present embodiment include the method set forth below. However, such method of forming layers is not limited thereto.

A lower layer, being a specific Ti compound layer, is formed on a surface of a substrate. The lower layer may be formed by, for example, the method set forth below.

For instance, a Ti compound layer, being comprised of a Ti nitride layer (hereinafter also referred to as a "TiN layer"), can be formed by chemical vapor deposition with a raw material composition of $TiCl_4$: from 5.0 mol % or more to 10.0 mol % or less, $N_2$: from 20 mol % or more to 60 mol % or less, and $H_2$: the balance, a temperature of from 850° C. or higher to 950° C. or lower, and a pressure of from 300 hPa or higher to 400 hPa or lower.

A Ti compound layer, being comprised of a Ti carbide layer (hereinafter also referred to as a "TiC layer"), can be formed by chemical vapor deposition with a raw material composition of $TiCl_4$: from 1.5 mol % or more to 3.5 mol % or less, $CH_4$: from 3.5 mol % or more to 5.5 mol % or less, and $H_2$: the balance, a temperature of from 950° C. or higher to 1,050° C. or lower, and a pressure of from 70 hPa or higher to 80 hPa or lower.

A Ti compound layer, being comprised of a Ti carbonitride layer (hereinafter also referred to as a "TiCN layer"), can be formed by chemical vapor deposition with a raw material composition of $TiCl_4$: from 5.0 mol % or more to 7.0 mol % or less, $CH_3CN$: from 0.5 mol % or more to 1.5 mol % or less, and $H_2$: the balance, a temperature of from 800° C. or higher to 900° C. or lower, and a pressure of from 60 hPa or higher to 80 hPa or lower.

A Ti compound layer, being comprised of a Ti oxycarbonitride layer (hereinafter also referred to as a "TiCNO layer"), can be formed by chemical vapor deposition with a raw material composition of $TiCl_4$: from 3.0 mol % or more to 4.0 mol % or less, CO: from 0.5 mol % or more to 1.0 mol % or less, $N_2$: from 30 mol % or more to 40 mol % or less, and $H_2$: the balance, a temperature of from 950° C. or higher to 1,050° C. or lower, and a pressure of from 50 hPa or higher to 150 hPa or lower.

A Ti compound layer, being comprised of a Ti carboxide layer (hereinafter also referred to as a "TiCO layer"), can be formed by chemical vapor deposition with a raw material composition of $TiCl_4$: from 1.0 mol % or more to 2.0 mol % or less, CO: from 2.0 mol % or more to 3.0 mol % or less, and $H_2$: the balance, a temperature of from 950° C. or higher to 1,050° C. or lower, and a pressure of from 50 hPa or higher to 150 hPa or lower.

An intermediate layer, being comprised of an α-type aluminum oxide layer, is formed on a surface of the lower layer. The intermediate layer may be formed by, for example, the method set forth below.

Firstly, a lower layer, being comprised of one or more Ti compound layers, is formed on a surface of a substrate. Then, a surface of a layer which is most distant from the substrate is oxidized (hereinafter this step is also referred to as an "oxidation step"). Thereafter, a nucleus of an α-type aluminum oxide layer is formed on a surface of the oxidized layer (hereinafter this step is also referred to as a "nucleus formation step"), and an α-type aluminum oxide layer is then formed in the state in which such nucleus has been formed (hereinafter this step is also referred to as a "deposition step").

In the oxidation step, the oxidation of the surface of the layer which is most distant from the substrate is performed under the conditions of a raw material composition of 002: from 0.1 mol % or more to 1.0 mol % or less and $H_2$: the balance, a temperature of from 800° C. or higher to 900° C. or lower, and a pressure of from 50 hPa or higher to 70 hPa or lower. Here, the oxidation time is preferably from 3 minutes or more to 10 minutes or less.

In the nucleus formation step, the nucleus of the α-type aluminum oxide layer is formed by chemical vapor deposition with a raw material composition of $AlCl_3$: from 2.0 mol % or more to 4.0 mol % or less, $CO_2$: from 0.5 mol % or more to 2.0 mol % or less, HCl: from 1.5 mol % or more to 2.5 mol % or less, $H_2S$: from 0.1 mol % or more to 0.3 mol % or less, and $H_2$: the balance, a temperature of from 800° C. or higher to 900° C. or lower, and a pressure of from 200 hPa or higher to 300 hPa or lower.

Then, in the deposition step, the α-type aluminum oxide layer is formed by chemical vapor deposition with a raw material composition of $AlCl_3$: from 2.0 mol % or more to 4.0 mol % or less, $CO_2$: from 3.0 mol % or more to 7.0 mol % or less, HCl: from 1.5 mol % or more to 2.5 mol % or less, $H_2S$: from 0.5 mol % or more to 0.8 mol % or less, and $H_2$: the balance, a temperature of from 950° C. or higher to 1,050° C. or lower, and a pressure of from 60 hPa or higher to 120 hPa or lower.

The following measures may be employed, by way of example, in order to have the texture coefficient TC (110) of the α-type aluminum oxide layer fall within a predetermined range. That is, in the nucleus formation step, a low-temperature condition (for example, a temperature condition which falls within the above range) may be set, a high-pressure condition (for example, a pressure condition which falls within the above range) may be set, the $CO_2$ concentration in the raw material composition may be decreased, and the $H_2S$ concentration in the raw material composition may be decreased. Further, in the deposition step, a high-temperature condition (for example, a temperature condition which falls within the above range) may be set, a low-pressure condition (for example, a pressure condition which falls within the above range) may be set, the $CO_2$ concentration in the raw material composition may be increased, and the $H_2S$ concentration in the raw material composition may be increased.

An upper layer, being comprised of a TiCN layer, is formed on a surface of the intermediate layer comprised of the α-type aluminum oxide layer. The upper layer may be formed by, for example, the method set forth below.

A TiCN layer can be formed by chemical vapor deposition with a raw material composition of $TiCl_4$: from 8.0 mol % or more to 10.0 mol % or less, $CH_3CN$: from 0.5 mol % or more to 2.0 mol % or less, $N_2$: from 5.0 mol % or more to 10.0 mol % or less, and $H_2$: the balance, a temperature of from 950° C. or higher to 1,050° C. or lower, and a pressure of from 70 hPa or higher to 90 hPa or lower.

The following measures may be employed, by way of example, in order to have the texture coefficient TC (511) of the TiCN layer fall within a predetermined range. That is, in the upper layer formation step, a high-temperature condition (for example, a temperature condition which falls within the above range) may be set, and the $TiCl_4$ concentration in the raw material composition may be increased (for example, the $TiCl_4$ concentration may be set to fall within the above range). It should be noted that, if the $CH_3CN$ concentration in the raw material composition is excessively high or the texture coefficient TC (110) of the intermediate layer is excessively low, this leads to the tendency that the texture coefficient TC (511) cannot be increased.

The thickness of each layer in the coating layer of the coated cutting tool of the present embodiment can be measured by observing a cross-sectional structure of the coated cutting tool, using an optical microscope, a scanning electron microscope (SEM), an FE-SEM, or the like. It should be noted that, as to the average thickness of each layer in the coated cutting tool of the present embodiment, such average thickness can be obtained by: measuring the thickness of each layer at three or more locations near the position 50 μm from the edge, toward the center of the rake surface of the coated cutting tool; and calculating the arithmetic mean of the resulting measurements. Further, the composition of each layer can be measured from a cross-sectional structure of the coated cutting tool of the present embodiment, using an energy-dispersive X-ray spectroscope (EDS), a wavelength-dispersive X-ray spectroscope (WDS), or the like.

EXAMPLES

Although the present invention will be described in further detail below, with examples, the present invention is not limited to such examples.

A cemented carbide cutting insert with a shape of JIS standard CNMG120412 and a composition of 88.5WC-8.2Co-1.5TiN-1.5NbC-0.3$Cr_3C_2$ (mass %) was prepared as a substrate. The edge of such substrate was subjected to round honing by means of an SiC brush, and the surface of the substrate was then washed.

After the substrate surface was washed, a coating layer was formed by chemical vapor deposition. Firstly, the substrate was inserted into an external heating chemical vapor deposition apparatus, and a first layer (a TiN layer or a TiC layer), whose composition is shown in Table 5, was formed on the substrate surface so as to have the average thickness shown in Table 5 under the raw material composition, temperature and pressure conditions shown in Table 1. Then, a second layer (a TiCN layer), whose composition is shown in Table 5, was formed on the surface of the first layer so as to have the average thickness shown in Table 5 under the raw material composition, temperature and pressure conditions shown in Table 1. Next, a third layer (a TiCNO layer or a TiCO layer), whose composition is shown in Table 5, was formed on the surface of the second layer so as to have the average thickness shown in Table 5 under the raw material composition, temperature and pressure conditions shown in Table 1. As a result, a lower layer constituted by three layers was formed. Next, the surface of the third layer was oxidized under the raw material composition, temperature and pressure conditions shown in Table 1. The oxidation time was 7 minutes. Then, a nucleus of α-type aluminum oxide was formed on the oxidized surface of the third layer under the raw material composition, temperature and pressure conditions shown in Table 2. Further, an intermediate layer (an α-type aluminum oxide layer), whose composition is shown in Table 5, was formed on the surface of the third layer and the surface of the nucleus of α-type aluminum oxide (α-type $Al_2O_3$) so as to have the average thickness shown in Table 5 under the raw material composition, temperature and pressure conditions shown in Table 3. Lastly, an upper layer (a TiCN layer), whose composition is shown in Table 5, was formed on the surface of the α-type aluminum oxide layer so as to have the average thickness shown in Table 5 under the raw material composition, temperature and pressure conditions shown in Table 4. As a result, the coated cutting tools of invention samples 1 to 14 and comparative samples 1 to 9 were obtained.

The thickness of each layer of each of the samples was obtained as set forth below. That is, using an FE-SEM, the average thickness was obtained by: measuring the thickness of each layer, from each of the cross-sectional surfaces at three locations near the position 50 μm from the edge of the coated cutting tool, toward the center of the rake surface thereof; and calculating the arithmetic mean of the resulting measurements. Using an EDS, the composition of each layer of the obtained sample was measured from the cross-sectional surface near the position at most 50 μm from the edge of the coated cutting tool, toward the center of the rake surface thereof.

TABLE 1

| Each layer composition/Process | Temperature (° C.) | Pressure (hPa) | Raw material composition (mol %) |
|---|---|---|---|
| TiN layer | 900 | 350 | $TiCl_4$: 7.5%, $N_2$: 40.0%, $H_2$: 52.5% |
| TiC layer | 1,000 | 75 | $TiCl_4$: 2.4%, $CH_4$: 4.6%, $H_2$: 93.0% |
| TiCN layer | 850 | 70 | $TiCl_4$: 6.0%, $CH_3CN$: 1.0%, $H_2$: 93.0% |
| TiCNO layer | 1,000 | 100 | $TiCl_4$: 3.5%, CO: 0.7%, $N_2$: 35.5%, $H_2$: 60.3% |
| TiCO layer | 1,000 | 80 | $TiCl_4$: 1.5%, CO: 2.5%, $H_2$: 96.0% |
| Oxidation | 850 | 60 | $CO_2$: 0.5%, $H_2$: Balance |

TABLE 2

Intermediate layer (nucleus formation step)

| Sample No. | Temperature (° C.) | Pressure (hPa) | $AlCl_3$ | $CO_2$ | HCl | $H_2S$ | $H_2$ |
|---|---|---|---|---|---|---|---|
| Invention sample 1 | 850 | 250 | 3.0 | 1.0 | 1.5 | 0.1 | 94.40 |
| Invention sample 2 | 850 | 250 | 3.0 | 1.0 | 1.5 | 0.1 | 94.40 |
| Invention sample 3 | 850 | 250 | 3.0 | 1.0 | 1.5 | 0.1 | 94.40 |
| Invention sample 4 | 800 | 250 | 4.0 | 1.0 | 1.5 | 0.3 | 93.20 |
| Invention sample 5 | 900 | 300 | 2.0 | 1.0 | 1.5 | 0.1 | 95.40 |
| Invention sample 6 | 850 | 200 | 2.0 | 2.0 | 1.5 | 0.1 | 94.40 |
| Invention sample 7 | 850 | 200 | 2.0 | 2.0 | 1.5 | 0.1 | 94.40 |
| Invention sample 8 | 850 | 250 | 2.0 | 2.0 | 1.5 | 0.1 | 94.40 |
| Invention sample 9 | 850 | 200 | 2.0 | 2.0 | 2.5 | 0.1 | 93.40 |
| Invention sample 10 | 850 | 200 | 2.0 | 2.0 | 2.5 | 0.1 | 93.40 |
| Invention sample 11 | 850 | 300 | 2.0 | 0.5 | 2.5 | 0.1 | 94.90 |
| Invention sample 12 | 850 | 250 | 2.0 | 1.0 | 2.5 | 0.1 | 94.40 |
| Invention sample 13 | 850 | 250 | 2.0 | 1.0 | 2.5 | 0.1 | 94.40 |
| Invention sample 14 | 800 | 200 | 3.0 | 2.0 | 2.5 | 0.3 | 92.20 |
| Comparative sample 1 | 850 | 250 | 2.0 | 1.0 | 2.5 | 0.1 | 94.40 |
| Comparative sample 2 | — | | | | | | |
| Comparative sample 3 | 850 | 250 | 3.0 | 1.0 | 1.5 | 0.1 | 94.40 |
| Comparative sample 4 | 850 | 250 | 3.0 | 1.0 | 1.5 | 0.1 | 94.40 |
| Comparative sample 5 | 850 | 250 | 3.0 | 1.0 | 1.5 | 0.1 | 94.40 |
| Comparative sample 6 | 900 | 300 | 2.0 | 1.0 | 1.5 | 0.1 | 95.40 |
| Comparative sample 7 | 850 | 200 | 2.0 | 2.0 | 2.5 | 0.1 | 93.40 |
| Comparative sample 8 | 850 | 200 | 2.0 | 2.0 | 2.5 | 0.1 | 93.40 |
| Comparative sample 9 | 1,000 | 250 | 3.0 | 1.0 | 1.5 | 0.7 | 93.80 |

In the table, the symbol "—" indicates that a nucleus formation step was not performed.

TABLE 3

Intermediate layer (deposition step)

| Sample No. | Temperature (° C.) | Pressure (hPa) | $AlCl_3$ | $CO_2$ | HCl | $H_2S$ | $H_2$ |
|---|---|---|---|---|---|---|---|
| Invention sample 1 | 1,000 | 70 | 3.0 | 5.0 | 1.5 | 0.50 | 90.00 |
| Invention sample 2 | 1,000 | 70 | 3.0 | 5.0 | 1.5 | 0.50 | 90.00 |
| Invention sample 3 | 1,000 | 70 | 3.0 | 5.0 | 1.5 | 0.50 | 90.00 |
| Invention sample 4 | 950 | 70 | 4.0 | 3.0 | 1.5 | 0.80 | 90.70 |
| Invention sample 5 | 1,050 | 70 | 2.0 | 7.0 | 1.5 | 0.50 | 89.00 |
| Invention sample 6 | 1,000 | 70 | 2.0 | 5.0 | 1.5 | 0.50 | 91.00 |
| Invention sample 7 | 1,000 | 70 | 2.0 | 5.0 | 1.5 | 0.50 | 91.00 |
| Invention sample 8 | 1,000 | 70 | 2.0 | 5.0 | 1.5 | 0.50 | 91.00 |
| Invention sample 9 | 1,000 | 120 | 2.0 | 5.0 | 2.5 | 0.50 | 90.00 |
| Invention sample 10 | 1,000 | 120 | 2.0 | 5.0 | 2.5 | 0.50 | 90.00 |
| Invention sample 11 | 1,000 | 120 | 2.0 | 5.0 | 2.5 | 0.50 | 90.00 |
| Invention sample 12 | 1,000 | 120 | 2.0 | 5.0 | 2.5 | 0.50 | 90.00 |
| Invention sample 13 | 1,000 | 120 | 2.0 | 5.0 | 2.5 | 0.50 | 90.00 |
| Invention sample 14 | 950 | 120 | 3.0 | 3.0 | 2.5 | 0.80 | 90.70 |
| Comparative sample 1 | 1,000 | 120 | 2.0 | 5.0 | 2.5 | 0.50 | 90.00 |
| Comparative sample 2 | 1,000 | 70 | 3.0 | 5.0 | 1.5 | 0.50 | 90.00 |
| Comparative sample 3 | 1,000 | 70 | 3.0 | 5.0 | 1.5 | 0.50 | 90.00 |
| Comparative sample 4 | 1,000 | 70 | 3.0 | 5.0 | 1.5 | 0.50 | 90.00 |
| Comparative sample 5 | 1,000 | 70 | 3.0 | 5.0 | 1.5 | 0.50 | 90.00 |
| Comparative sample 6 | 1,050 | 70 | 2.0 | 7.0 | 1.5 | 0.50 | 89.00 |
| Comparative sample 7 | 1,000 | 120 | 2.0 | 5.0 | 2.5 | 0.50 | 90.00 |
| Comparative sample 8 | 1,000 | 120 | 2.0 | 5.0 | 2.5 | 0.50 | 90.00 |
| Comparative sample 9 | 950 | 120 | 2.0 | 5.0 | 2.5 | 0.20 | 90.30 |

TABLE 4

| Sample No. | Upper layer | | | | | |
|---|---|---|---|---|---|---|
| | Temperature (°C.) | Pressure (hPa) | Raw material composition (mol %) | | | |
| | | | TiCl$_4$ | CH$_3$CN | N$_2$ | H$_2$ |
| Invention sample 1 | 1,000 | 70 | 10.0 | 1.0 | 5.0 | 84.0 |
| Invention sample 2 | 1,000 | 70 | 9.0 | 1.0 | 5.0 | 85.0 |
| Invention sample 3 | 1,000 | 70 | 8.0 | 2.0 | 5.0 | 85.0 |
| Invention sample 4 | 1,000 | 70 | 10.0 | 1.0 | 5.0 | 84.0 |
| Invention sample 5 | 1,050 | 70 | 8.0 | 2.0 | 5.0 | 85.0 |
| Invention sample 6 | 1,000 | 70 | 9.0 | 1.0 | 10.0 | 80.0 |
| Invention sample 7 | 1,000 | 70 | 9.0 | 1.0 | 10.0 | 80.0 |
| Invention sample 8 | 1,000 | 70 | 9.0 | 1.0 | 10.0 | 80.0 |
| Invention sample 9 | 1,000 | 90 | 9.0 | 1.0 | 10.0 | 80.0 |
| Invention sample 10 | 1,000 | 90 | 9.0 | 1.0 | 10.0 | 80.0 |
| Invention sample 11 | 1,000 | 90 | 8.0 | 1.0 | 10.0 | 81.0 |
| Invention sample 12 | 1,000 | 90 | 9.0 | 1.0 | 5.0 | 85.0 |
| Invention sample 13 | 1,000 | 90 | 9.0 | 1.0 | 5.0 | 85.0 |
| Invention sample 14 | 1,050 | 90 | 10.0 | 0.7 | 5.0 | 84.3 |
| Comparative sample 1 | 1,000 | 70 | 6.0 | 1.0 | 5.0 | 88.0 |
| Comparative sample 2 | 1,000 | 70 | 8.0 | 1.0 | 5.0 | 86.0 |
| Comparative sample 3 | 1,000 | 70 | 9.0 | 1.0 | 10.0 | 80.0 |
| Comparative sample 4 | 1,000 | 70 | 9.0 | 1.0 | 10.0 | 80.0 |
| Comparative sample 5 | 1,000 | 70 | 9.0 | 1.0 | 10.0 | 80.0 |
| Comparative sample 6 | 1,050 | 90 | 8.0 | 1.0 | 10.0 | 81.0 |
| Comparative sample 7 | 1,000 | 90 | 9.0 | 1.0 | 5.0 | 85.0 |
| Comparative sample 8 | 1,000 | 90 | 9.0 | 1.0 | 5.0 | 85.0 |
| Comparative sample 9 | 950 | 90 | 6.0 | 2.0 | 5.0 | 88.0 |

TABLE 5

| Sample No. | Coating layer | | | | | | | | | | |
|---|---|---|---|---|---|---|---|---|---|---|---|
| | Lower layer | | | | | | Intermediate layer | | Upper layer | | Thickness of entire coating layer (μm) |
| | First layer | | Second layer | | Third layer | | Thickness of entire lower layer (μm) | | | | |
| | Composition | Average thickness (μm) | Composition | Average thickness (μm) | Composition | Average thickness (μm) | | Composition | Crystal system | Composition | Average thickness (μm) | Composition | Average thickness (μm) | |
| Invention sample 1 | TiN | 0.2 | TiCN | 6.0 | TiCNO | 0.3 | 6.5 | Al$_2$O$_3$ | α | 5.0 | TiCN | 2.5 | 14.0 |
| Invention sample 2 | TiN | 0.2 | TiCN | 6.0 | TiCNO | 0.3 | 6.5 | Al$_2$O$_3$ | α | 5.0 | TiCN | 2.5 | 14.0 |
| Invention sample 3 | TiN | 0.2 | TiCN | 6.0 | TiCNO | 0.3 | 6.5 | Al$_2$O$_3$ | α | 5.0 | TiCN | 2.5 | 14.0 |
| Invention sample 4 | TiN | 0.2 | TiCN | 6.0 | TiCNO | 0.3 | 6.5 | Al$_2$O$_3$ | α | 5.0 | TiCN | 2.5 | 14.0 |
| Invention sample 5 | TiN | 0.2 | TiCN | 6.0 | TiCNO | 0.3 | 6.5 | Al$_2$O$_3$ | α | 5.0 | TiCN | 2.5 | 14.0 |
| Invention sample 6 | TiN | 0.2 | TiCN | 7.0 | TiCNO | 0.3 | 7.5 | Al$_2$O$_3$ | α | 5.0 | TiCN | 1.5 | 14.0 |
| Invention sample 7 | TiN | 0.2 | TiCN | 3.5 | TiCNO | 0.3 | 4.0 | Al$_2$O$_3$ | α | 5.0 | TiCN | 5.0 | 14.0 |
| Invention sample 8 | TiN | 0.2 | TiCN | 3.0 | TiCNO | 0.3 | 3.5 | Al$_2$O$_3$ | α | 8.0 | TiCN | 2.5 | 14.0 |
| Invention sample 9 | TiC | 0.2 | TiCN | 6.0 | TiCNO | 0.3 | 6.5 | Al$_2$O$_3$ | α | 5.0 | TiCN | 2.5 | 14.0 |
| Invention sample 10 | TiN | 0.2 | TiCN | 6.0 | TiCO | 0.3 | 6.5 | Al$_2$O$_3$ | α | 5.0 | TiCN | 2.5 | 14.0 |
| Invention sample 11 | TiN | 0.2 | TiCN | 4.0 | TiCNO | 0.3 | 4.5 | Al$_2$O$_3$ | α | 4.0 | TiCN | 2.5 | 11.0 |
| Invention sample 12 | TiN | 0.2 | TiCN | 6.0 | TiCNO | 0.3 | 6.5 | Al$_2$O$_3$ | α | 8.0 | TiCN | 8.0 | 22.5 |
| Invention sample 13 | TiN | 0.2 | TiCN | 9.0 | TiCNO | 0.3 | 9.5 | Al$_2$O$_3$ | α | 7.0 | TiCN | 2.5 | 19.0 |
| Invention sample 14 | TiN | 0.2 | TiCN | 6.0 | TiCNO | 0.3 | 6.5 | Al$_2$O$_3$ | α | 5.0 | TiCN | 2.5 | 14.0 |
| Comparative sample 1 | TiN | 0.2 | TiCN | 6.0 | TiCNO | 0.3 | 6.5 | Al$_2$O$_3$ | α | 5.0 | TiCN | 2.5 | 14.0 |
| Comparative sample 2 | TiN | 0.2 | TiCN | 6.0 | TiCNO | 0.3 | 6.5 | Al$_2$O$_3$ | α | 5.0 | TiCN | 2.5 | 14.0 |

TABLE 5-continued

| | Coating layer | | | | | | | | | | | |
|---|---|---|---|---|---|---|---|---|---|---|---|---|
| | Lower layer | | | | | | | | | | | |
| | First layer | | Second layer | | Third layer | | Thickness of entire lower layer (μm) | Intermediate layer | | | Upper layer | | Thickness of entire coating layer (μm) |
| Sample No. | Composition | Average thickness (μm) | Composition | Average thickness (μm) | Composition | Average thickness (μm) | | Composition | Crystal system | Average thickness (μm) | Composition | Average thickness (μm) | |
| Comparative sample 3 | TiN | 0.2 | TiCN | 8.0 | TiCNO | 0.3 | 8.5 | Al$_2$O$_3$ | α | 5.0 | TiCN | 0.5 | 14.0 |
| Comparative sample 4 | TiN | 0.2 | TiCN | 3.0 | TiCNO | 0.3 | 3.5 | Al$_2$O$_3$ | α | 8.0 | TiCN | 11.0 | 22.5 |
| Comparative sample 5 | TiN | 0.2 | TiCN | 6.0 | TiCNO | 0.3 | 6.5 | Al$_2$O$_3$ | α | 20.0 | TiCN | 2.5 | 29.0 |
| Comparative sample 6 | TiN | 0.2 | TiCN | 7.0 | TiCNO | 0.3 | 7.5 | Al$_2$O$_3$ | α | 1.0 | TiCN | 2.5 | 11.0 |
| Comparative sample 7 | TiN | 0.2 | TiCN | 1.0 | TiCNO | 0.3 | 1.5 | Al$_2$O$_3$ | α | 5.0 | TiCN | 7.5 | 14.0 |
| Comparative sample 8 | TiN | 0.2 | TiCN | 16.0 | TiCNO | 0.3 | 16.5 | Al$_2$O$_3$ | α | 10.0 | TiCN | 2.5 | 29.0 |
| Comparative sample 9 | TiN | 0.2 | TiCN | 9.0 | TiCNO | 0.3 | 9.5 | Al$_2$O$_3$ | α | 7.0 | TiCN | 2.5 | 19.0 |

As to the obtained samples, i.e., invention samples 1 to 14 and comparative samples 1 to 9, an X-ray diffraction measurement by means of a 2θ/θ focusing optical system with Cu-Kα radiation was performed under the following conditions: an output: 50 kV, 250 mA; an incident-side solar slit: 5°; a divergence longitudinal slit: 2/3°; a divergence longitudinal limit slit: 5 mm; a scattering slit: 2/3°; a light-receiving side solar slit: 5°; a light-receiving slit: 0.3 mm; a BENT monochromater; a light-receiving monochrome slit: 0.8 mm; a sampling width: 0.01°; a scan speed: 4°/min; and a 2θ measurement range: 20°-155°. As to the apparatus, an X-ray diffractometer (model "RINT TTR III") manufactured by Rigaku Corporation was used. The peak intensity for each crystal plane of each of the α-type aluminum oxide layer and the TiCN layer was obtained from an X-ray diffraction pattern. A texture coefficient TC (110) in the α-type aluminum oxide layer and a texture coefficient TC (511) in the TiCN layer were each obtained from the resulting peak intensity for each crystal plane. The results are shown in Table 6.

TABLE 6

| Sample No. | Intermediate layer TC (110) | Upper layer TC (511) |
|---|---|---|
| Invention sample 1 | 4.4 | 4.7 |
| Invention sample 2 | 4.4 | 3.2 |
| Invention sample 3 | 4.4 | 1.6 |
| Invention sample 4 | 6.0 | 3.4 |
| Invention sample 5 | 1.8 | 2.8 |
| Invention sample 6 | 4.4 | 3.2 |
| Invention sample 7 | 4.4 | 3.1 |
| Invention sample 8 | 4.4 | 3.2 |
| Invention sample 9 | 4.4 | 3.3 |
| Invention sample 10 | 4.4 | 3.2 |
| Invention sample 11 | 4.2 | 2.8 |
| Invention sample 12 | 4.6 | 3.2 |
| Invention sample 13 | 4.4 | 3.2 |
| Invention sample 14 | 6.1 | 4.8 |
| Comparative sample 1 | 4.4 | 0.7 |
| Comparative sample 2 | 0.5 | 0.5 |
| Comparative sample 3 | 4.4 | 3.1 |
| Comparative sample 4 | 4.4 | 3.2 |
| Comparative sample 5 | 4.4 | 3.1 |
| Comparative sample 6 | 1.8 | 2.7 |
| Comparative sample 7 | 4.4 | 3.2 |
| Comparative sample 8 | 4.4 | 3.2 |
| Comparative sample 9 | 0.5 | 0.5 |

A cutting test was conducted using the obtained samples, i.e., invention samples 1 to 14 and comparative samples 1 to 9, under the following conditions.

[Cutting Test]
Workpiece material: S45C round bar with one groove
Cutting speed: 280 m/min
Feed: 0.30 mm/rev
Depth of cut: 1.8 mm
Coolant: Used
Evaluation items: A time when a sample was fractured or had a maximum flank wear width of 0.3 mm was defined as the end of the tool life, and the machining time to reach the end of the tool life was measured. Further, the damage state after 10 minutes from the start of cutting was checked with an SEM. It should be noted, however, that when a sample was fractured before the elapse of 10 minutes from the start of cutting, the damage state indicates that the sample was fractured at the relevant time point.

As to the machining time to reach the end of the tool life in the cutting test (wear test), evaluations were made with grade "A" for 25 minutes or more, grade "B" for 20 minutes or more and less than 25 minutes, and grade "C" for less than 20 minutes. In such evaluations, "A" refers to excellent, "B" refers to good and "C" refers to inferior, meaning that a sample involving "A" or "B" has excellent cutting performance. The obtained evaluation results are shown in Table 7.

TABLE 7

| Sample No. | Damage state | Machining time (min) | Grade |
|---|---|---|---|
| Invention sample 1 | Normal wear | 30 | A |
| Invention sample 2 | Normal wear | 26 | A |
| Invention sample 3 | Normal wear | 23 | B |
| Invention sample 4 | Normal wear | 28 | A |
| Invention sample 5 | Normal wear | 20 | B |
| Invention sample 6 | Normal wear | 24 | B |
| Invention sample 7 | Normal wear | 29 | A |
| Invention sample 8 | Normal wear | 28 | A |
| Invention sample 9 | Normal wear | 25 | A |
| Invention sample 10 | Normal wear | 25 | A |
| Invention sample 11 | Normal wear | 21 | B |
| Invention sample 12 | Normal wear | 34 | A |
| Invention sample 13 | Normal wear | 33 | A |
| Invention sample 14 | Normal wear | 32 | A |
| Comparative sample 1 | Normal wear | 17 | C |
| Comparative sample 2 | Fracturing | 8 | C |
| Comparative sample 3 | Normal wear | 15 | C |
| Comparative sample 4 | Fracturing | 6 | C |
| Comparative sample 5 | Fracturing | 5 | C |
| Comparative sample 6 | Chipping | 12 | C |
| Comparative sample 7 | Normal wear | 18 | C |
| Comparative sample 8 | Fracturing | 5 | C |
| Comparative sample 9 | Fracturing | 6 | C |

The results in Table 7 show that each invention sample had grade "B" or higher in the wear test. Meanwhile, as to the evaluations made on the comparative samples, each comparative sample had grade "C" in the wear test. Accordingly, it is apparent that the wear resistance of each invention sample is more excellent than that of each comparative sample. It is apparent from the above results that each invention sample has excellent wear resistance and fracture resistance, thereby resulting in a longer tool life.

INDUSTRIAL APPLICABILITY

The coated cutting tool according to the present invention has excellent wear resistance while not involving a reduction in fracture resistance so that the tool life can be extended more than that involved in the prior art, and from such perspective, the coated cutting tool has industrial applicability.

REFERENCE SIGNS LIST

1: Substrate, 2: Lower layer, 3: Intermediate layer, 4: Upper layer, 5: Coating layer, 6: Coated cutting tool.

What is claimed is:
1. A coated cutting tool comprising a substrate and a coating layer formed on a surface of the substrate, wherein:
the coating layer comprises a lower layer, an intermediate layer formed on a surface of the lower layer, and an upper layer formed on a surface of the intermediate layer;
the lower layer is a Ti compound layer of one or more layers selected from the group consisting of a Ti carbide layer, a Ti nitride layer, a Ti carbonitride layer, a Ti carboxide layer and a Ti oxycarbonitride layer;
an average thickness of the lower layer is from 3.0 μm or more to 15.0 μm or less;
the intermediate layer is comprised of an α-type aluminum oxide layer;
an average thickness of the intermediate layer is from 3.0 μm or more to 15.0 μm or less;
in the α-type aluminum oxide layer, a texture coefficient TC (110) of a (110) plane represented by formula (1) below is from 1.5 or more to 6.5 or less;
the upper layer is comprised of a Ti carbonitride layer;
an average thickness of the upper layer is from 1.5 μm or more to 8.0 μm or less; and
in the Ti carbonitride layer in the upper layer, a texture coefficient TC (511) of a (511) plane represented by formula (2) below is from 1.5 or more to 5.0 or less,

$$TC(110) = \frac{I(110)}{I_0(110)} \left\{ \frac{1}{8} \Sigma \frac{I(hkl)}{I_0(hkl)} \right\}^{-1} \quad (1)$$

(In formula (1), I (hkl) denotes a peak intensity for an (hkl) plane in X-ray diffraction of the α-type aluminum oxide layer, $I_0$ (hkl) denotes a standard diffraction intensity for an (hkl) plane which is indicated on JCPDS Card No. 10-0173 for α-type aluminum oxide, and (hkl) refers to the eight crystal planes of (012), (104), (110), (113), (024), (116), (214) and (030),)

$$TC(511) = \frac{I(511)}{I_0(511)} \left\{ \frac{1}{6} \Sigma \frac{I(hkl)}{I_0(hkl)} \right\}^{-1} \quad (2)$$

(In formula (2), I (hkl) denotes a peak intensity for an (hkl) plane in X-ray diffraction of the Ti carbonitride layer, $I_0$ (hkl) denotes an average value of a standard diffraction intensity for an (hkl) plane which is indicated on JCPDS Card No. 32-1383 for Ti carbide and a standard diffraction intensity for an (hkl) plane which is indicated on JCPDS Card No. 32-1420 for Ti nitride, and (hkl) refers to the six crystal planes of (111), (200), (220), (311), (422) and (511).

2. The coated cutting tool according to claim 1, wherein, in the Ti carbonitride layer in the upper layer, the texture coefficient TC (511) is from 3.0 or more to 5.0 or less.

3. The coated cutting tool according to claim 1, wherein, in the α-type aluminum oxide layer, the texture coefficient TC (110) is from 4.0 or more to 6.5 or less.

4. The coated cutting tool according to claim 1, wherein an average thickness of the entire coating layer is from 7.5 μm or more to 25.0 μm or less.

5. The coated cutting tool according to claim 1, wherein the substrate is a cemented carbide, cermet, ceramic or a cubic boron nitride sintered body.

6. The coated cutting tool according to claim 2, wherein, in the α-type aluminum oxide layer, the texture coefficient TC (110) is from 4.0 or more to 6.5 or less.

7. The coated cutting tool according to claim 2, wherein an average thickness of the entire coating layer is from 7.5 μm or more to 25.0 μm or less.

8. The coated cutting tool according to claim 3, wherein an average thickness of the entire coating layer is from 7.5 μm or more to 25.0 μm or less.

9. The coated cutting tool according to claim 6, wherein an average thickness of the entire coating layer is from 7.5 μm or more to 25.0 μm or less.

10. The coated cutting tool according to claim 2, wherein the substrate is a cemented carbide, cermet, ceramic or a cubic boron nitride sintered body.

11. The coated cutting tool according to claim 3, wherein the substrate is a cemented carbide, cermet, ceramic or a cubic boron nitride sintered body.

12. The coated cutting tool according to claim 4, wherein the substrate is a cemented carbide, cermet, ceramic or a cubic boron nitride sintered body.

13. The coated cutting tool according to claim 6, wherein the substrate is a cemented carbide, cermet, ceramic or a cubic boron nitride sintered body.

14. The coated cutting tool according to claim 7, wherein the substrate is a cemented carbide, cermet, ceramic or a cubic boron nitride sintered body.

15. The coated cutting tool according to claim 8, wherein the substrate is a cemented carbide, cermet, ceramic or a cubic boron nitride sintered body.

16. The coated cutting tool according to claim 9, wherein the substrate is a cemented carbide, cermet, ceramic or a cubic boron nitride sintered body.

* * * * *